(12) United States Patent
Altemark et al.

(10) Patent No.: US 7,840,312 B2
(45) Date of Patent: Nov. 23, 2010

(54) POWER CONTROL OF A WIND FARM AND METHOD THEREOF

(75) Inventors: Jens Altemark, Rendsburg (DE);
Holger Becker, Hamburg (DE);
Sebastian Friederich, Rendsburg (DE)

(73) Assignee: REpower Systems AG, Hamburg (DE)

( * ) Notice: Subject to any disclaimer, the term of this patent is extended or adjusted under 35 U.S.C. 154(b) by 0 days.

(21) Appl. No.: 11/793,372

(22) PCT Filed: Dec. 15, 2005

(86) PCT No.: PCT/EP2005/013508

§ 371 (c)(1),
(2), (4) Date: Dec. 19, 2007

(87) PCT Pub. No.: WO2006/066797

PCT Pub. Date: Jun. 29, 2006

(65) Prior Publication Data

US 2008/0088129 A1    Apr. 17, 2008

(30) Foreign Application Priority Data

Dec. 17, 2004    (DE) .................. 10 2004 060 943

(51) Int. Cl.
*H04J 3/18* (2006.01)
*F03D 9/00* (2006.01)
*G05D 17/00* (2006.01)

(52) U.S. Cl. .................. 700/286; 290/44; 290/55

(58) Field of Classification Search .................. 700/40, 700/46, 286–290, 41–45; 290/44, 55; 416/132 B
See application file for complete search history.

(56) References Cited

U.S. PATENT DOCUMENTS

| | | | |
|---|---|---|---|
| 5,798,631 A * | 8/1998 | Spee et al. .................. | 322/25 |
| 7,071,579 B2 * | 7/2006 | Erdman et al. .................. | 290/55 |
| 2004/0178639 A1 | 9/2004 | Wobben | |
| 2005/0046196 A1 * | 3/2005 | Larsen .................. | 290/44 |

(Continued)

FOREIGN PATENT DOCUMENTS

EP    1 512 869    3/2005

(Continued)

OTHER PUBLICATIONS

International Search Report dated Mar. 29, 2006 directed to counterpart PCT application No. PCT/EP2005/013508.

(Continued)

*Primary Examiner*—M. N. Von Buhr
(74) *Attorney, Agent, or Firm*—Morrison & Foerster LLP (57) ABSTRACT

A wind farm includes a plurality of wind energy installations which generate electrical energy to be output to a power supply system and a wind farm master for controlling the wind energy installations. Each wind energy installation includes a generator which is driven by a rotor, and the wind farm master includes a power control device having a plurality of loops. This plurality of loops includes a fast loop that includes a controller which acts on a first group of the wind energy installations and a slow loop that includes a controller which acts on a second group of the wind energy installations, the fast controller having a substantially higher dynamic than the slow controller.

13 Claims, 5 Drawing Sheets

U.S. PATENT DOCUMENTS

2006/0132993 A1* 6/2006 Delmerico et al. ............ 361/20
2006/0273595 A1* 12/2006 Avagliano et al. ............ 290/44

FOREIGN PATENT DOCUMENTS

WO    WO-03/030329    4/2003

OTHER PUBLICATIONS

Christiansen et al. (Mar. 2001). "Grid Connection and Remote Control for the Horns Rev 150 MW Offshore Wind Farm in Denmark," *International Workshop on Transmission Networks for Offshore Wind Farms*, pp. 1-11.

Svensson et al. (Apr. 2002). "Wind Farm Control Software Structure," *International Workshop on Transmission Networks for Offshore Wind Farms*, pp. 1-15.

International Preliminary Report on Patentability and Written Opinion dated Jul. 16, 2007, directed to counterpart application No. PCT/EP2005/013508 (12 pages).

* cited by examiner

POWER CONTROL OF A WIND FARM AND METHOD THEREOF

REFERENCE TO RELATED APPLICATIONS

This application is a national stage application under 35 USC 371 of International Application No. PCT/EP2005/013508, filed Dec. 15, 2005, which claims the priority of German Application No. 10 2004 060 943.8, filed Dec. 17, 2004, the contents of both of which prior applications are incorporated herein by reference.

FIELD OF THE INVENTION

The invention relates to a wind farm having a plurality of wind energy installations and a wind farm master for controlling the wind energy installations, the wind energy installations having a generator, which is driven by means of a rotor, for generating electrical power, and the wind farm master having a power control device.

BACKGROUND OF THE INVENTION

In recent times, wind energy installations are preferably not installed individually, but combined in groups as wind farms. Usually, such wind farms are positioned at locations which are particularly favorable in terms of wind, such as at the coast or in elevated areas. Since the individual wind energy installation nowadays already achieves powers which before were attained by entire wind farms, modern wind farms have a very high installed electrical power. The connection of such wind farms with a high power to electrical energy supply systems is not without problems. Particular attention must be paid to maintaining a high system quality. As the number of wind farms which are connected to an electrical supply system increases, stricter provisions with respect to the behavior of the wind farms on the system by the energy supply companies are required. This includes, for example, the behavior of the wind farms with respect to the system in the event of faults. An example of such faults are voltage dips, which may arise as a result of a short circuit or as a result of a sudden failure of power station power.

The wind farm master of a wind farm functions as a superordinate control system for the individual wind energy installations of the wind farm. Requirements of the operator of the wind farm as well as the operator of the energy supply system to which the wind farm is connected are in this case converted into control signals for the individual wind energy installations. This means that the wind farm, at its connection point to the energy supply system, meets the set requirements. An important function of the wind farm master is to monitor and control the power output to the power supply system, namely both true power and wattless power.

One disadvantage of this known arrangement is the fact that it sometimes responds very slowly to changed requirements. Although the wind farm master is generally provided with a sufficiently high computation power, the transmission of the control signals to the individual wind energy installations requires a comparatively large amount of time. Although generally separate communications lines are provided, considerable delays result. Typical delay times are 1 to 2 seconds for the transmission via the communications lines and a further 0.1 second for the conversion, until finally the converter can convert the signals. Owing to these long delay times, the behavior of the wind farm is not optimal in the event of changed requirements. This applies in particular in the case of rapidly changing conditions, such as gusty winds. In addition, owing to the long delay times, fluctuations in the control behavior may arise.

SUMMARY OF THE INVENTION

The invention is based on the object of providing a wind farm of the type mentioned at the outset and a method for its operation which avoids the abovementioned disadvantages or at least reduces them. The solution according to the invention consists in the features as broadly disclosed herein. Advantageous developments are the subject matter of the preferred embodiments.

According to the invention, in the case of a wind farm having a plurality of wind energy installations, which generate electrical energy to be output to a power supply system, and a wind farm master for controlling the wind energy installations, the wind energy installations having a generator, which is driven by means of a rotor, and the wind farm master having a power control device, provision is made for the power control device to be designed to have a plurality of loops, with a fast loop comprising a fast controller, which acts on a first group of the wind energy installations, and a slow loop comprising a slow controller, which acts on a second group of the wind energy installations, the fast controller having a substantially higher dynamic than the slower controller.

Some of the terms used will be explained below:

A generator is understood to mean a machine which converts mechanical energy into electrical energy. This includes both DC machines and generators for single-phase or polyphase alternating current. It may be a synchronous machine or an asynchronous machine. In general, a converter is connected to the generator, but this is not absolutely necessary. The converter is preferably in the form of a double converter. It may be desired to have a variety of topologies, such as, for example, with a voltage intermediate circuit, with a current intermediate circuit or as a direct converter.

A wind farm master is understood to mean a control device which acts on the individual wind energy installations of a wind farm as a superordinate entity. In general, it is designed to control the output of the electrical energy generated by the wind energy installations at a connection point. Furthermore, it is generally designed to receive and convert input values on the part of the wind farm operator or the operator of the electrical system to which the wind farm is connected. The wind farm master is often in the form of a separate unit; however, it is not impossible for it to be arranged in one of the wind energy installations of the wind farm or even to be completely integrated in it, with the result that certain components are used jointly with the installation control system of the wind energy installation accommodating it. Expediently, the wind energy installation accommodating it is assigned to the fast control loop.

A group of wind energy installations is understood to mean a natural number of wind energy installations, the minimum number being 1.

A dynamic is understood to mean a measure of the speed of a control loop when correcting a control deviation. In continuous controller concepts, such as in particular the PI controller and the PID controller, the respective time constant of the controller is a measure of the dynamic. In controller concepts with a finite setting time, such as in particular the deadbeat controller, the setting time is a measure of the dynamic. The term dynamic is in this case generally to be understood such that it can describe both the response of the controller to jumps in reference variables and interference variables.

The invention is based on the concept of providing a double-loop structure for the power control device. The wind energy installations of the wind farm are divided into at least two groups, which are driven differently by the wind farm master. The wind energy installations of the second group are connected to a controller, which conventionally responds relatively slowly to changes in power. The wind energy installations of the first group, on the other hand, are connected to a fast loop, whose controller has a higher dynamic. It is thus possible to respond quickly to changes in desired values or to faults by acting on the wind energy installations of the first group. The steady-state accuracy over a relatively long period of time is in this case ensured by the wind energy installations of the second group which are connected to the slow channel. In this way, the invention combines the advantages of fast control with respect to the fast correction of faults or jumps in desired values with those of a slower control, such as the resistance to vibrations. By splitting the power control device into two control loops with different dynamics according to the invention (also referred to below as the slow and fast controllers), this is possible in an astonishingly simple manner. Complex controller concepts are not required for this purpose. The invention can also be realized with good results even with comparatively simple controller concepts, such as P controllers or PI controllers.

Expediently, the fast and the slow loop of the control device are cascaded. Cascaded is in this case understood to mean that an output signal of the fast controller is used as an input signal for the slow controller. This has the advantage that only one reference variable needs to be applied to the multi-loop controller according to the invention. The complexity in terms of circuitry is thus reduced. Furthermore, it has the advantage over separate reference variable inputting that there is no longer any need for mutual matching of the separate reference variables. The risk of instabilities owing to reference variables which have not been matched to one another or even contradict one another, such as may occur in the case of reference variables being applied separately, is thus avoided. A further advantage here is the fact that, ideally, the desired value for the slow controller therefore has no mean value. The reference variable behavior of the slow controller can therefore be optimized for steady-state accuracy around the zero position. Furthermore, the fast controller can preferably be designed to compensate for faults (or transients, desired-value jumps).

It is particularly expedient to design the multi-loop control device according to the invention as a wattless power control device. For the true power, in this case a dedicated control device is provided which may have any desired design. Precisely in the case of wattless power control devices, it is important for maintaining a high degree of system quality that they are designed to respond fast. With the wattless power control device according to the invention, owing to the multi-loop structure it is possible to respond particularly rapidly to changes, faults, etc. Therefore, thanks to the invention, even stringent requirements of the system operator can be met with a comparatively low degree of complexity. With the multi-loop structure and its fast loop, the invention takes advantage of the particular properties of the wattless power that it has no mechanical equivalent. The invention has recognized that a fast control loop can therefore be formed which can respond to fast changes in the manipulated variable "wattless power", without the risk of the mechanical system being damaged or impaired (for example owing to overload as a result of a sudden fluctuating load). The fast loop can therefore be optimized individually to a good wattless power interference characteristic without needing to compromise with respect to steady-state accuracy. With the multi-loop structures according to the invention, this advantage can be used fully.

Preferably, the fast controller is connected so as to act directly on the converters of the wind energy installations of the first group. Act directly in this case is understood to mean that the operational control of the individual wind energy installations is at least functionally avoided. This means that delay times are minimized. The converters can respond quickly to changed manipulated variables of the fast controller. This results in an improved response of the entire wind farm in the event of faults or desired-value jumps. The direct connection can be established in various ways. One advantageous possibility consists in connecting the output of the fast controller, via a dedicated transmission channel, to the converters of the wind energy installation of the first group. The dedicated transmission channel may be, for example, a dedicated line. Such an embodiment using individual wire technology has the advantage of having a simple and clear concept; it also guarantees short transfer times and therefore short response times. One disadvantage, however, is the comparatively high degree of complexity. In order to reduce this, however, provision may also be made for a separate high-speed data network to be connected to the output of the fast controller and for it to be connected to the converters of the wind energy installations of the first group. High speed is in this case understood to mean that the data network has a higher transmission speed for the data present at the output of the fast controller than the data network used for other communication in the wind farm. With such a high-speed network, a reduction in the transmission time can likewise be achieved as in the case of individual wire technology, but with reduced installation complexity. Preferably, the high-speed data network is provided with a real-time capability.

In order to further improve the control behavior, provision may be made for the wind energy installations of the first group to be arranged electrically close to the connection point to the power supply system. Electrically close is in this case understood to mean that the distance between the connection lines and the respective wind energy installations is as short as possible. In general, the electrical distance follows the physical distance, but deviations may result from detours in the guidance of the line. The electrically short arrangement means that actuating signals of the fast controller only need to be transferred over a short path and therefore are applied quickly to the converters of the wind energy installations of the first group. Furthermore, subsequent changes in the power output of this wind energy installation become effective quickly at the connection point. This results in a dual effect with respect to the shortening of the response time.

Reference variables for the controller may be predetermined as constant values, but are preferably variable. In order that this is also made possible externally, a reference variable connection of the controller is expediently connected to a control input. In this way, input values can be transferred by the operator of the wind farm or by the system operator to the controller.

In accordance with one further aspect of the invention, which is possibly used for independent protection, a wind farm is provided with a plurality of wind energy installations, which generate electrical energy to be output to a power supply system, and a wind farm master for controlling the wind energy installations, the wind energy installations having a generator, which is driven by means of a rotor, and the wind farm master having a power controller, the wind energy installations being split into a first and a second group, the controller being part of a slow loop, which acts on the second group, of a multi-loop structure, which also has a fast loop, which acts on the second group. With this control loop structure, in contrast to the abovementioned embodiments, the wind farm master is not responsible for the fast loop for the first group of wind energy installations. Expediently, the fast loop is autonomous. This can advantageously be achieved by virtue of the fact that a corresponding control functionality is integrated in the control device of one of the wind energy installations of the first group. Such an embodiment is particularly advantageous when the first group comprises only a single wind energy installation. This makes possible not only an uncomplicated construction, but also a good operational behavior thanks to short transfer times. It is therefore easily possible to design the fast loop such that it acts directly on the converter of the wind energy installation. It goes without saying that in this aspect of the invention as well, the wind energy installation of the fast loop is arranged as close as possible to the connection point.

For further explanations and advantageous embodiments, reference is made to the description given for the first aspect of the invention.

In addition, the invention relates to a method for operating a wind farm having a plurality of wind energy installations, which generate electrical energy to be output to a power supply system, and a wind farm master for controlling the wind energy installations, the wind energy installations each having a generator, which is driven by means of a rotor, and the wind farm master having a power control device, comprising the steps of calculating set values for an electrical power of the wind energy installations to be output to the power supply system in accordance with a control algorithm, outputting the set values to the wind energy installations. According to the invention, provision is made for a first desired value for a power of a first group of wind energy installations which is to be output to be calculated in a first loop of the control algorithm and for a second desired value for a second group of wind energy installations to be calculated by means of a second loop of the control algorithm, a higher dynamic being provided for the first loop of the control algorithm than for the second loop.

For a more detailed explanation, reference is made to the description above, which describes the way in which the method according to the invention functions.

BRIEF DESCRIPTION OF THE DRAWINGS

The invention will be explained below with reference to the attached drawing, in which an advantageous exemplary embodiment of the invention is illustrated and in which.

DETAILED DESCRIPTION OF THE INVENTION

Figure 1:
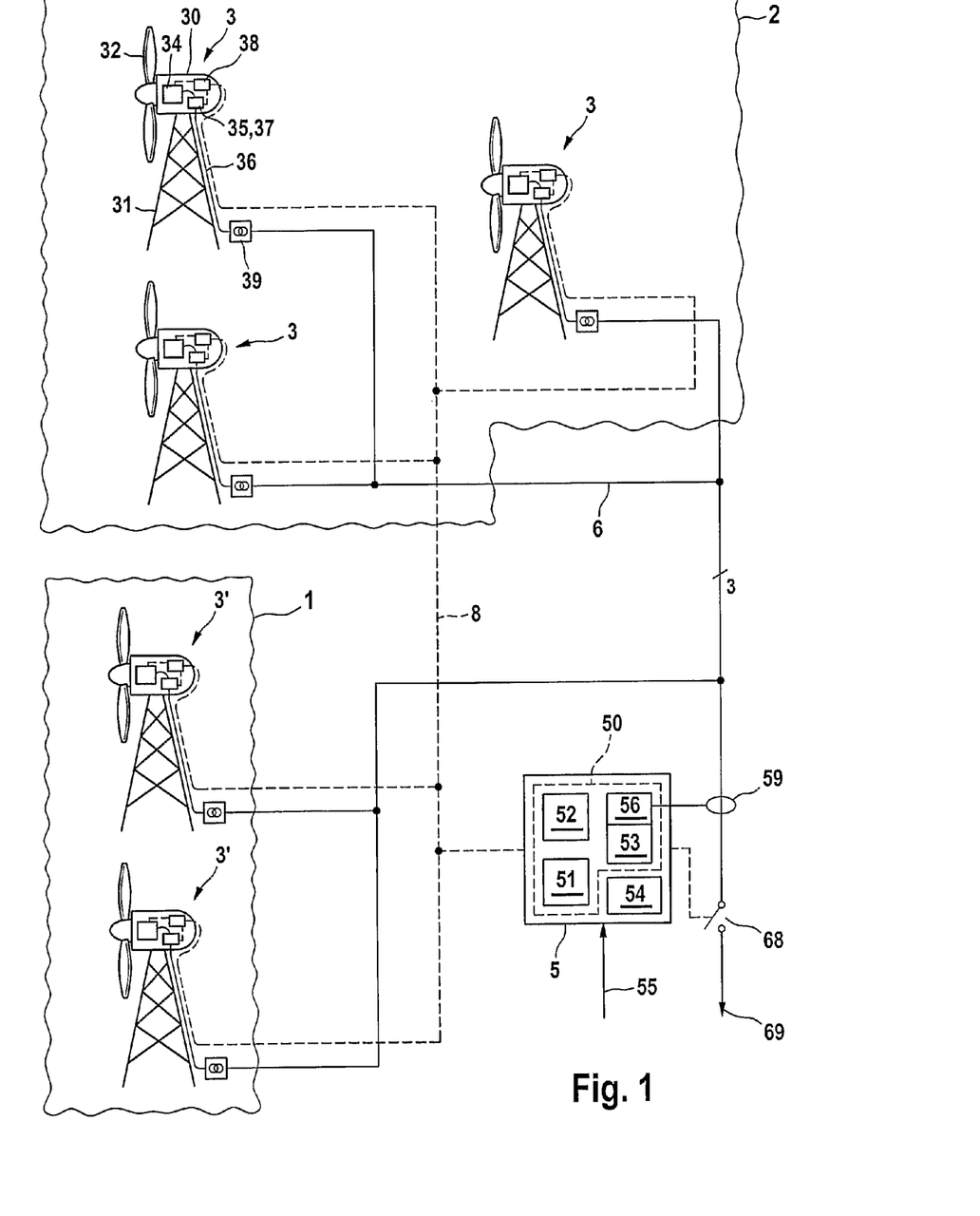
FIG. 1 shows a schematic view of a wind farm in accordance with an exemplary embodiment of the invention.

FIG. 1 illustrates an exemplary embodiment of a wind farm according to the invention. It comprises a plurality of wind energy installations 3 and a central control computer (wind farm master) 5. The wind energy installations 3 are connected to a wind farm-internal bus system 6, which is connected to an electrical power supply system (not illustrated) of an energy supply company via a connection point 69.

Figure 3A:
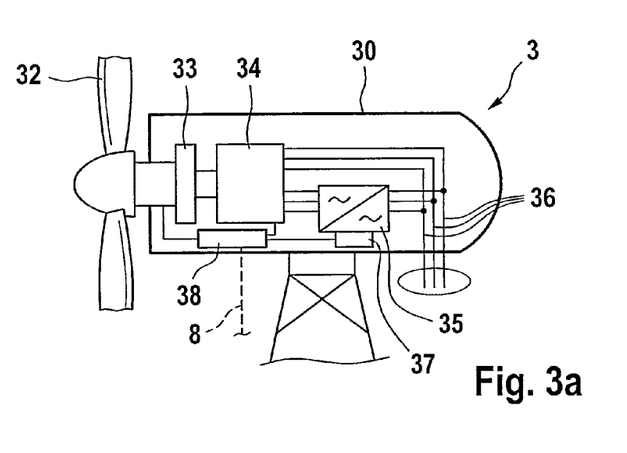
FIGS. 3a and 3b together show schematic sectional illustrations of wind energy installations used in the two groups.
Figure 3B:
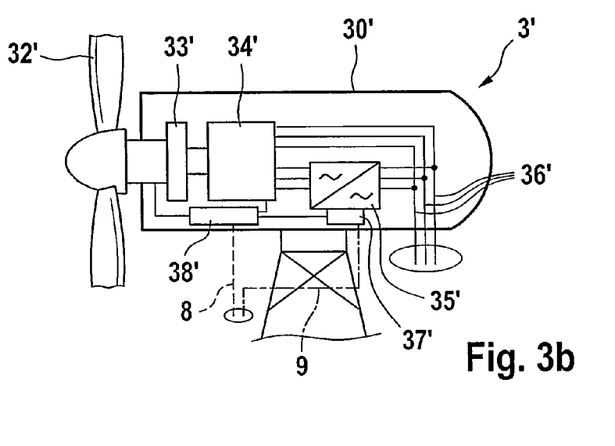

The design of a wind energy installation 3 will be explained by way of example with reference to FIGS. 1 and 3a. The wind energy installations 3 comprises a machine housing 30, which is arranged pivotably on a tower 31. A rotor 32 is arranged rotatably on an end side of the machine housing 30. The rotor 32 drives a generator 34 via a rotor shaft and a gear mechanism 33. The generator is preferably a double-fed asynchronous generator, but other designs are also possible. A converter 35 and output lines 36 for the generated electrical energy are connected to the generator 34. The electrical energy produced by the generator 34 is therefore provided as a three-phase alternating current with a fixed frequency (system frequency). The operation of the wind energy installation 3 is controlled by a control device 38. It acts on the individual components of the wind energy installation 3 via suitable control lines, which are only partially illustrated. In particular, it is connected to a converter control system 37, which drives active switches (not illustrated) in the converter 35 in such a way that the desired output values for current, voltage, frequency and phase are set. The converter control system 37 is designed to set the true power P and wattless power Q output by the wind energy installation 3 by means of the converter 35. Furthermore, a transformer 39 is provided at the wind energy installation 3, which transformer transforms the voltage output by the converter 35 to a higher level for it then to be fed into the wind farm-internal bus line 6. The wind energy installation 3' illustrated in FIG. 3b has a corresponding design. It also has an additional input at its converter control system 37'.

The bus line 6 is connected to all of the wind energy installations 3 of the wind farm. It transports the electrical energy produced by them to a connection point 69 (illustrated symbolically), at which it is fed into the energy supply system (not illustrated). In the exemplary embodiment illustrated, the bus line 6 has a structure which is branched in the form of a tree; it could equally well be in the form of a bus structure with spur lines, and combinations are likewise possible. A switching device 68 is provided upstream of the connection point 69 at a central point on the bus line 6. It is designed to connect the wind farm to the connection point 69 and therefore to the energy transmission system, or to isolate it from it. On the wind-farm side of this switching device 68, a power measuring device 59 is provided for the wind farm master. A further power measuring device (not illustrated) may possibly be provided for the energy supply company on the wind-farm side or on the system side of the switching device 68.

The wind energy installations 3 of the wind farm are split into two groups. There is a first group 1, which, in the exemplary embodiment illustrated, comprises two wind energy installations 3'. These are wind energy installations 3' of the wind farm which are arranged electrically close to the connection point 69. Electrically close is in this case understood to mean that the lengths of the lines measured from the transformer 39 of the wind energy installation to the connection point 69 via the bus system 6 are short. In general, this means that the wind energy installations are also arranged physically close to the connection point 69; but this is not absolutely necessary.

The wind farm master 5 is provided for operating the wind farm and for controlling the electrical power provided at the connection point 69. It performs control functions for the wind energy installation 3 of the wind farm. A signal line network 8 is provided for transmitting control signals to the individual wind energy installations 3 of the wind farm. It connects the wind farm master 5 to the control devices 38 of the individual wind energy installations 3. The wind farm master 5 comprises a central control computer as the power control device 50 having a plurality of functional modules 51 to 53, a measurement module 56 and an input/output unit 54. An input connection 55 is connected to said input/output unit 54. It is designed to receive control messages from the wind farm operator or the operator of the power supply system and to communicate them to the power control device 50; a feedback channel capability may also possibly be provided for outputting data. The power measuring device 59 for the electrical energy output by the wind farm is connected to the measurement module 56. The power control device 50 controls the output wattless power Q by means of the functional modules 51, 52 and the output true power P by means of the functional module 53.

Figure 2A:
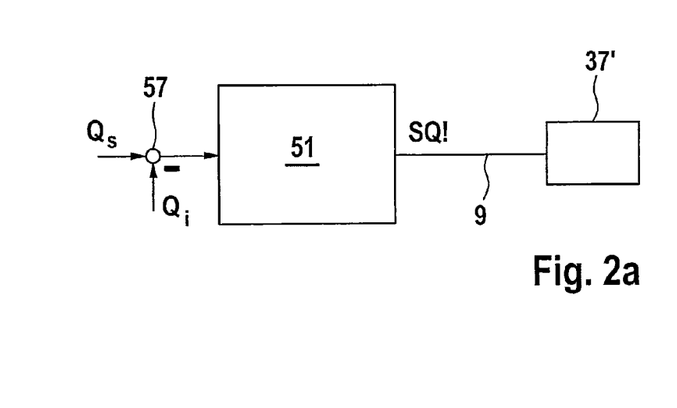
FIGS. 2a and 2b together show a schematic overview of a controller structure used for the wind farm illustrated in FIG. 1.
Figure 2B:
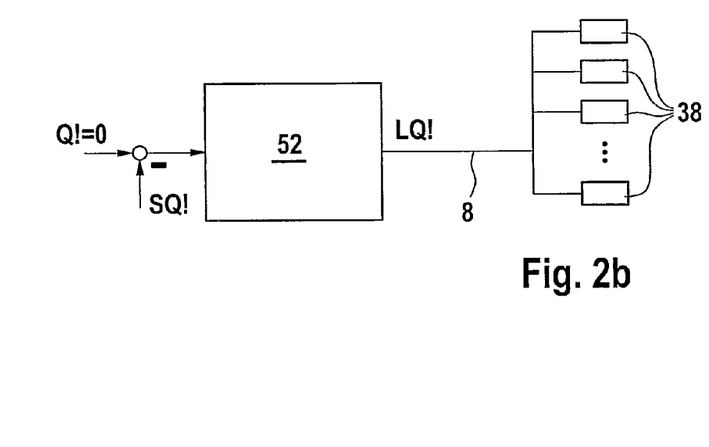

The controller structure will now be explained with reference to FIG. 4. The functional modules 51, 52 for controlling the wattless power Q are in the form of fast and slow controllers. A fast loop I is formed by the functional module 51 as the controller, the converter control systems 37' of the two wind energy installations 3' of group 1 as the actuating elements, the associated converter 35' as the control path, and the power measuring device 59 with the measurement module 56 as the feedback path. The latter is connected to a negative input of a summation element 57, at whose positive input a desired value for the wattless power $Q_s$ to be output is applied. The controller in the functional module 51 is, for example, a P controller or PD controller. Its time constant is short: it is preferably in the range of 0.5 ms-10 seconds, preferably 50 ms-3 seconds. The way in which the fast control loop functions will be described with reference to FIG. 4 and FIG. 2a. A desired value $Q_s$ for the wattless power to be output is predetermined by the operator of the wind farm or by the system operator. This inputting can take place explicitly, but it may also result implicitly, for example by a so-called voltage droop. This desired value is applied to the fast control loop I. A further input parameter is the actually output wattless power $Q_i$. It is likewise applied to the fast control loop. This value is a measured variable, which is determined by means of the power measuring device 59 with the measurement module 56 from the output voltage, the output current and the phase angle. The functional module 51, as the fast controller, calculates a fast manipulated value SQ! from this. This manipulated value is applied to the converter control system 37' of the wind energy installations 3' of group 1 via a direct connection 9. The converter control system 37' controls the converter 35' associated with it on the basis of the manipulated value inputs SQ!. In this way, the converters 35' are controlled in such a way that they quickly correct interference variables or, in the case of desired-value jumps, quickly change over to the new value. The measuring device 59 with the measurement module 56 is then used for feedback purposes. The fast control loop I is thus closed.

Furthermore, a slow control loop II is formed. This comprises the second functional module 52 as the slow controller, to whose output the control device 38 of the wind energy installations 3 of group 2 are connected. An optional input filter VF is connected to the input of said second functional module 52. This input filter is provided for carrying out any signal conditioning or processing which may be required. In the exemplary embodiment illustrated, it is in the form of a low-pass filter. A connection point is provided at its input. A desired value input for the wattless power Q! is applied to said connection point, which desired value input is fixed at 0, however. This means that the steady-state desired value for the slow control loop II is set to 0. However, it is not uncommon for a value unequal to zero to be applied which can also be determined in relation to the output power (for example as a power factor cos φ=0.8). The connection point is further connected to the output of the functional module 51 of the fast control loop I. Its manipulated variable SQ! is optionally smoothed and applied to the connection point. This means that the desired value of the slow control loop II is taken on by the fast control loop I. As a result, advantageous coupling of the two control loops I and II is achieved. The controller in the second functional module 52 is preferably designed for steady-state accuracy. In the exemplary embodiment illustrated, it is in the form of a PI controller. Very good results are also achieved with a PID controller. Sufficient steady-state accuracy is therefore achieved over a relatively long period of time. The controller parameters can be optimized in terms of this aspect since the fast control loop I is provided for compensating for high dynamic faults.

The actuating signals LQ! output at the output of the functional module 52 are applied to the control device 38 of the wind energy installations of group 2 via the general signal line network 8. Then, the converters 35 of the wind energy installations 3 of group 2 are therefore set in such a way that, in the steady state, the desired wattless power value is fed into the power supply system via the connection point 69. The slow control loop II in this exemplary embodiment does not have dedicated feedback, but uses for this purpose the feedback formed by the measuring device 59 and the measurement module 56 of the fast control loop I.

Figure 4:
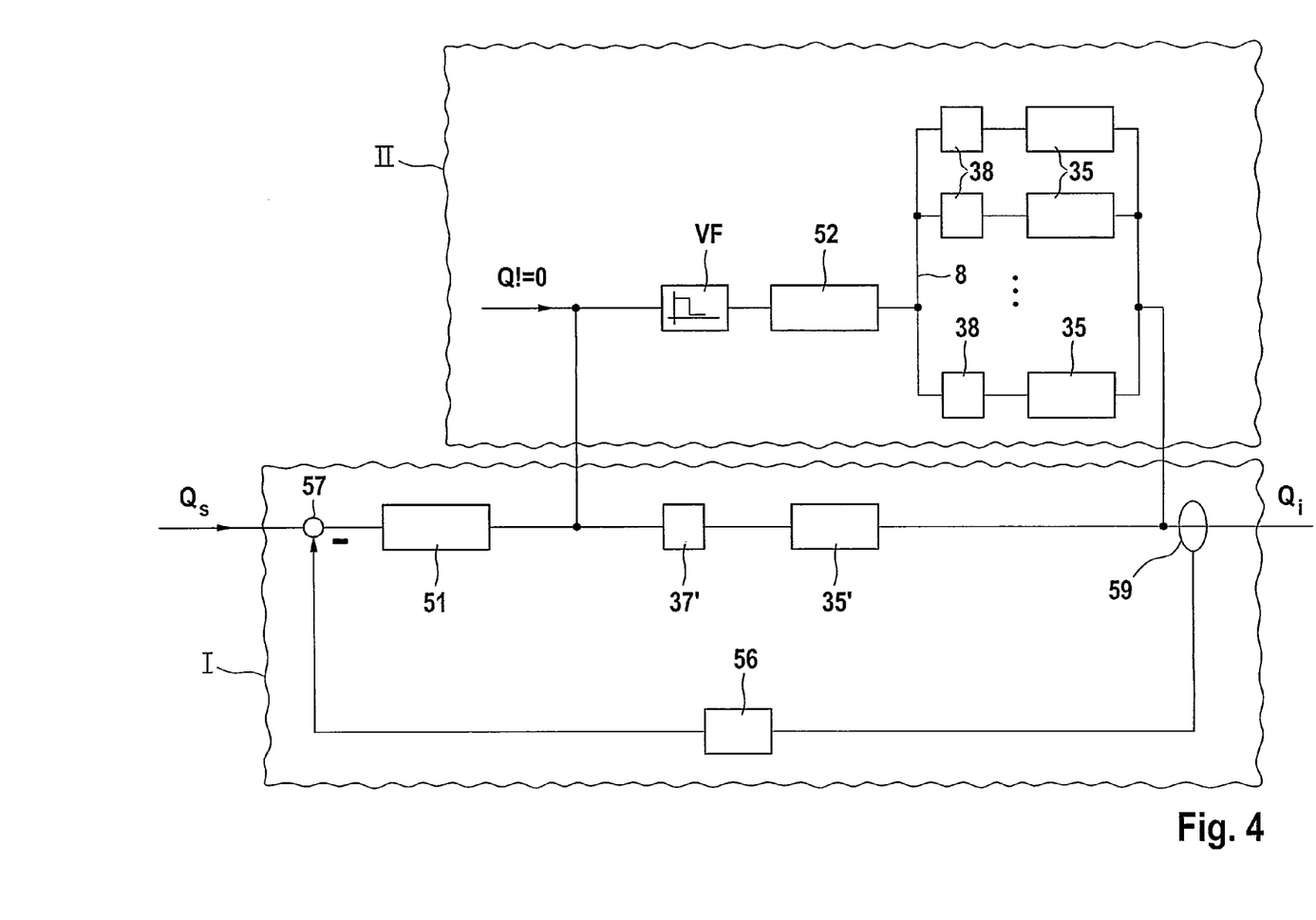
FIG. 4 shows a schematic view of the controller structure with control loops.
Figure 5:
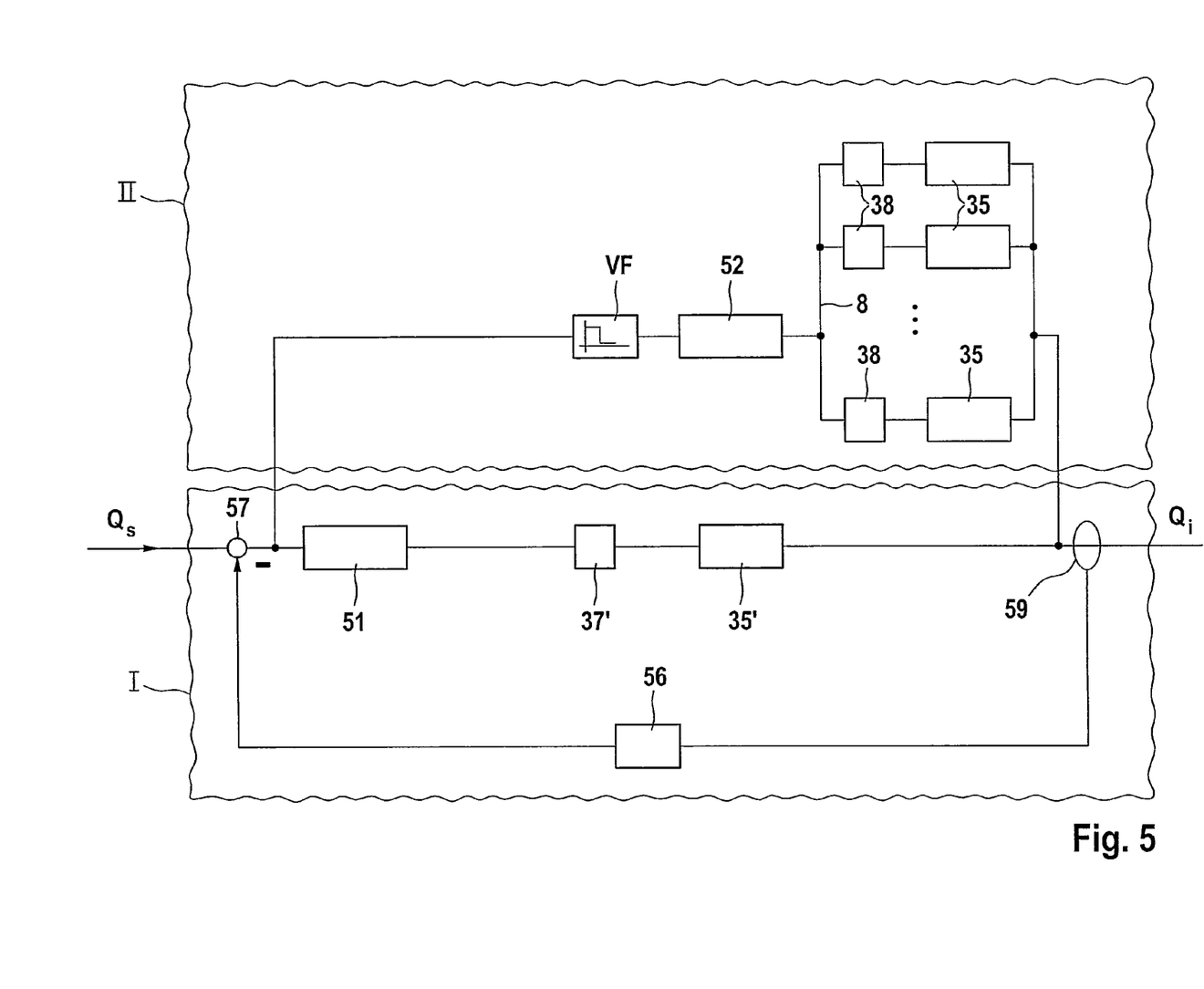
FIG. 5 shows an illustration of an alternative exemplary embodiment of the controller structure illustrated in FIG. 2.

One variant of the scheme illustrated in FIG. 4 is depicted in FIG. 5. It differs essentially by virtue of the fact that the desired value for the slow control loop II with the functional module 52 as the slow controller is not tapped off from the manipulated variable of the fast control loop I at the output of the functional module 51 as the fast controller, but instead is tapped off between the summation element 57 and the input of the functional module 51. In contrast to the variant illustrated in FIG. 4, in this variant the slow control loop II is not designed primarily to achieve steady-state accuracy of the output wattless power, but also to compensate for faults. The wind energy installations 3 of group 2 can therefore also be used for the compensation of faults, or for assistance in the case of desired-value jumps. In order that this advantage can be realized, careful matching of the functional modules 51, 52 as controllers of the two control loops I and II is required. On the other hand, there is the risk of control fluctuations owing to different control behaviors of the two functional modules 51, 52 arising. In order to minimize this risk, in the exemplary embodiment illustrated the input filter VF is in the form of a band-stop filter. It is dimensioned such that the conducting curve has a minimum in the main region of the faults. This means that, for most faults, the functional module 51 of the fast control loop I on its own has a corrective effect. Given certain, particularly radiofrequency faults, for example brought about by vibrations which cannot be managed by the fast control loop I, the slow control loop II is also connected. With its greater number of wind energy installations 3 of group 2, it can advantageously have a damping effect in such cases, with the result that the radiofrequency vibrations of the wattless power Q are reduced.

Figure 6:
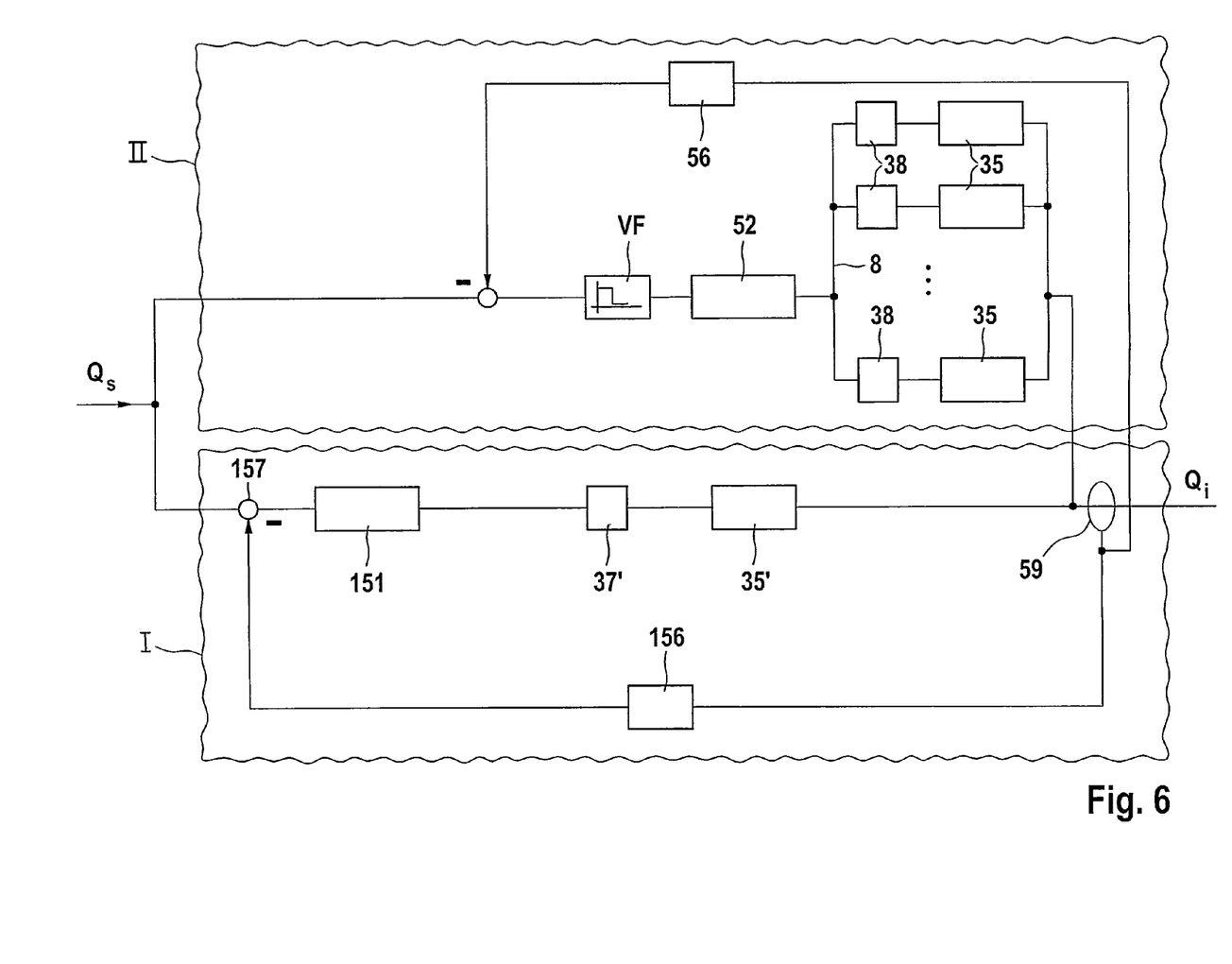
FIG. 6 shows a schematic view of the controller structure of a further alternative exemplary embodiment.

FIG. 6 illustrates a controller structure for a further alternative exemplary embodiment. In this exemplary embodiment, in contrast to the exemplary embodiments explained above, the wind farm master is not designed for control of the first group of wind energy installations, but only controls the second group 2 of wind energy installations. For this purpose, the wind farm master is provided, in the manner already explained above, with the measuring device 59 and the measurement module 56. Furthermore, the slow control loop II is connected to a desired value input for the desired value $Q_s$ for the wattless power to be output. In this way, control of the wattless power Q is achieved with the wind farm master 5, to be precise as the slow control loop II. For the fast control loop I, provision is made for the actually output desired power to likewise be detected via the measuring device 59. For further processing purposes, a separate measurement module 156 and a separate module 151 are provided, which act as a fast controller. The separate module 151 and preferably also the measurement module 156 are expediently integrated in the control device 38 of the wind installation of the fast control loop I. This is particularly expedient when, as is assumed here, only one wind energy installation is assigned to the fast control loop I. In turn, the desired value $Q_s$ for the wattless power to be output and, with the negative mathematic sign, the measured actually output wattless power are connected to the input of the separate module 151 as the fast controller via a separate summation element 157. Owing to the integration of the separate modules 156 and 151 in the control device 38 of the wind energy installation of the fast control loop I, it is possible for there to be direct action without any detours on the converters 35' of this wind energy installation. A high control dynamic is therefore possible. Faults or desired-value jumps can thus be corrected quickly. Furthermore, this embodiment offers the advantage that it is simple in terms of its concept and does not require any modifications made to the wind farm master 5.

The invention claimed is:

1. A wind farm having a plurality of wind energy installations which generate electrical energy to be output to a power supply system and a wind farm master for controlling the wind energy installations,
    the wind energy installations each comprising a generator which is driven by a rotor, and the wind farm master comprising a power control device having a plurality of loops,
    wherein the wind energy installations are divided into at least a first group and a second group, the first group being distinct from the second group, and
    the plurality of loops comprises a fast loop comprising a controller which acts on the first group of the wind energy installations and a slow loop comprising a controller which acts on the second group of the wind energy installations, the fast controller and the slow controller being configured differently in that parameters of the fast controller are set to a higher dynamic than those of the slow controller.

2. The wind farm of claim 1, wherein the fast and the slow loop are cascaded.

3. The wind farm of claim 2, wherein an actuating signal generated by the fast controller is connected as a reference signal to the slow controller.

4. The wind farm of claim 1, 2 or 3, wherein the power control device is a wattless power controller.

5. The wind farm of claim 1, 2 or 3, wherein the fast controller is configured to act directly on converters in the first group of wind energy installations.

6. The wind farm of claim 5, wherein an output of the fast controller is connected on the converters via separate transmission lines.

7. The wind farm of claim 5, an output of the fast controller is configured to act on the converters via a separate high-speed data network.

8. The wind farm of claim 1, 2 or 3, wherein the first group of wind energy installations is arranged electrically closer than the second group of wind energy installations to a connection point to the power supply system.

9. The wind farm as claimed of claim 1, 2 or 3, wherein the fast controller is designed to compensate for faults, and the slow controller is designed for steady-state accuracy.

10. The wind farm as claimed of claim 1, 2 or 3, wherein the power control device is configured to receive a reference variable via a control input for input values.

11. A method for operating the wind farm of claim 1, 2 or 3, comprising:
    writing an input value,
    calculating set values for electrical power of the wind energy installations to be output to the power supply system in accordance with a control algorithm, and
    outputting the set values to the wind energy installations,
    wherein the calculating of the set values comprises:
    calculating a first desired value for a power to be output of the first group of wind energy installations in a first loop of the control algorithm, and calculating a second desired value for the second group of wind energy installations in a second loop of the control algorithm, a higher dynamic being provided for the first loop than for the second loop.

12. A wind farm having a plurality of wind energy installations which generate electrical energy to be output to a power supply system and a wind farm master for controlling the wind energy installations,
    the wind energy installations each comprising a generator which is driven by a rotor, and the wind farm master comprising a power controller,
    wherein the wind energy installations are divided into at least a first group and a second group, the first group being distinct from the second group, and
    the controller has a multi-loop structure including a slow loop which acts on the second group and a fast loop which acts on the first group, the fast loop and the slow loop being configured differently in that parameters of the fast loop are set to a higher dynamic than those of the slow loop.

13. A method for operating a wind farm having a plurality of wind energy installations which generate electrical energy to be output to a power supply system and a wind farm master for controlling the wind energy installations, the wind energy installations each comprising a generator which is driven by a rotor, the wind energy installations being divided into at least a first group and a second group, the first group being distinct from the second group, and the wind farm master comprising a power control device, the method comprising:
    writing an input value,
    calculating set values for electrical power of the wind energy installations to be output to the power supply system in accordance with a control algorithm, and
    outputting the set values to the wind energy installations,
    wherein the calculating of the set values comprises:
    calculating a first desired value for a power to be output of the first group of the wind energy installations in a first loop of the control algorithm, and
    calculating a second desired value for the second group of the wind energy installations in a second loop of the control algorithm, wherein the first loop and the second loop are configured differently in that parameters of the first loop are set to a higher dynamic than those of the second loop.

* * * * *

UNITED STATES PATENT AND TRADEMARK OFFICE
CERTIFICATE OF CORRECTION

PATENT NO. : 7,840,312 B2  
APPLICATION NO. : 11/793372  
DATED : November 23, 2010  
INVENTOR(S) : Jens Altemark et al.

Page 1 of 1

It is certified that error appears in the above-identified patent and that said Letters Patent is hereby corrected as shown below:

On the Title Page,
Item (30) Foreign Application Priority Data:

Please replace "10 2004 060 943" with --10 2004 060 943.8--

Signed and Sealed this
Twenty-second Day of February, 2011

David J. Kappos
*Director of the United States Patent and Trademark Office*